Aug. 19, 1952     E. MERTEN ET AL     2,607,217
VISCOSITY METER

Filed Oct. 11, 1948     2 SHEETS—SHEET 1

Damping Factor: $\frac{(N-N_a)^2}{fp}$

Inventors: Eugen Merten
Marshall M. Robinson
By: *[signature]*
Their Attorney

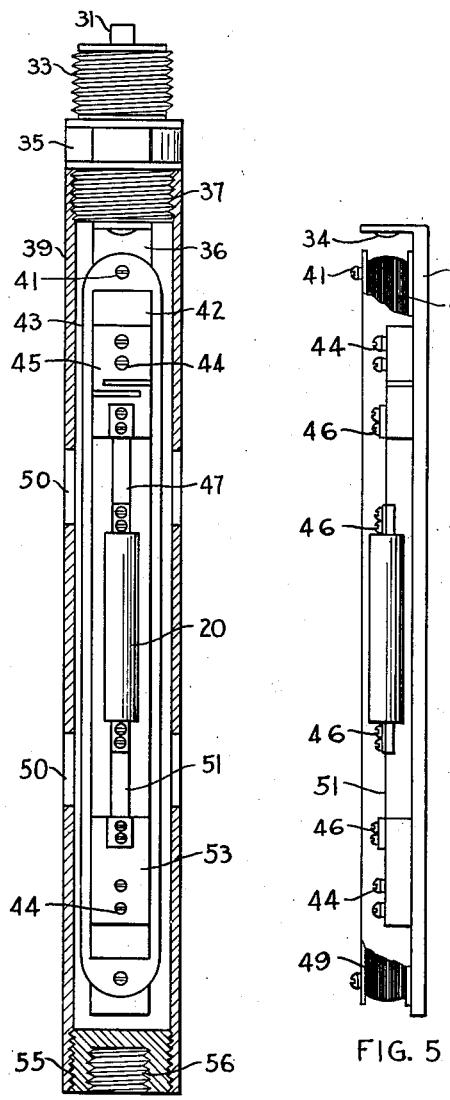

Patented Aug. 19, 1952

2,607,217

UNITED STATES PATENT OFFICE 2,607,217

VISCOSITY METER

Eugen Merten and Marshall M. Robinson, Houston, Tex., assignors to Shell Development Company, San Francisco, Calif., a corporation of Delaware Application October 11, 1948, Serial No. 53,822

9 Claims. (Cl. 73—54)

This invention relates to viscosity meters, and pertains particularly to a method and apparatus for measuring the viscosity of fluids located beyond the reach of or not accessible to the operator.

The operation of devices normally used in measuring the viscosity of fluids is based on effects connected with the flow of fluids through calibrated orifices, as in the Saybolt viscosimeter, or with the frictional drag on a body, such as a cylinder, rotating in a fluid, as in the Stormer viscosimeter, etc.

All these methods of viscosity measurement require that the fluid itself and all essential parts of the measuring apparatus be accessible to the operator for manipulation and adjustment, which is possible under normal operating or laboratory conditions.

In some cases, however, it is very desirable to measure the viscosity of a fluid in surroundings which are beyond the reach of an operator. Thus, in so called P-V-T or pressure-volume-temperature measurements connected with reservoir studies, it is necessary to measure the viscosity of a mineral oil fluid under the equilibrium conditions of pressure, temperature, admixture with gas, etc. which prevail in the reservoir or at the bottom of the borehole. For this purpose, samples of bottom hole fluid may be brought to the surface in pressure bombs for suitable measurement.

Since it is obviously impossible either to lower a conventional viscosimeter of the types mentioned to the bottom of a well, or to insert and manipulate such a viscosimeter within a pressure vessel or bomb in the laboratory, it is the object of this invention to provide a viscosimeter adapted for operation in remote places, such as the bottom of a well, or in enclosed spaces inaccessible to the operator.

It is also an object of this invention to provide a viscosimeter whose operation may be electrically started from a distance, and whose indications are transmitted to the operator in the form of electrical signals.

It is also an object of this invention to provide a viscosimeter whereby the viscosity of a fluid is measured as the rate of damping of a torsional pendulum immersed in the fluid.

It is also an object of this invention to provide a viscosimeter comprising a magnet and a coil mounted for relative oscillation with regard to each other, the damping action of said fluid on said relative oscillation being a measure of the viscosity of the fluid.

It is also an object of this invention to provide a viscosimeter of the above type wherein the relative mechanical oscillations of a magnet and a coil induce electrical currents in said coil, said currents being recorded outside the viscosimeter in the form of damped electrical oscillations, the decay of said oscillations being a measure of the viscosity of the fluid in which said magnet and coil oscillate with regard to each other.

These and other objects of the present invention will be understood from the following description taken with reference to the attached drawings wherein:

Fig. 4 is a cross-section view of an embodiment of the present invention adapted for operation at the bottom of a well.

Fig. 5 is a partial cross-section view of the device of Fig. 4, taken at right angles thereto.

Fig. 6 is a diagrammatic view of another embodiment of the present apparatus.

Fig. 7 is a cross-section view taken along line 7—7 of Fig. 6.

Figure 1:
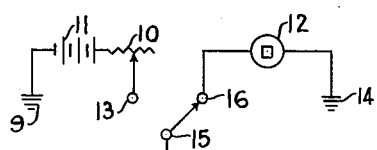
Fig. 1 is a diagram illustrating the principle of operation of the present instrument.
Figure 1:
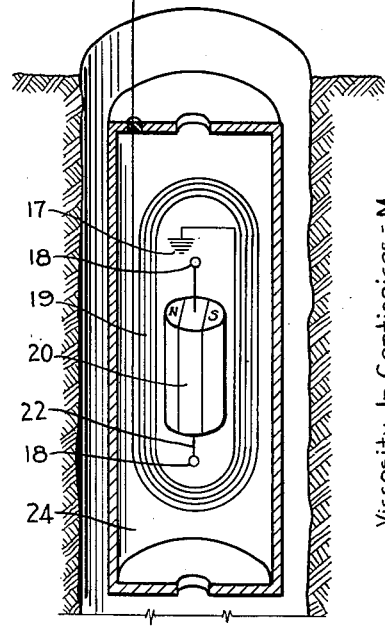

Referring to Fig. 1, the present viscosimeter comprises essentially a magnet element 20, which may, in one embodiment, have the shape of an elongated cylinder of approximately from 3 to 4 inches length and of ¼ to ½ inch diameter. The magnet is made of any metallic alloy of high coercive strength, having high retention characteristics, such as an alloy of steel, copper, nickel and cobalt, for example, an alloy technically known as Cunico, which permits the cylinder 20 to be magnetized so as to have its north and south poles located in diametrically opposite segments of the cylinder, as shown in Fig. 1, rather than at the axially opposite ends of the cylinder, as in conventional magnets. Elastic or resilient spring or filament elements 22, anchored to fixed points of support 18, mount the cylinder 20 as a torsion pendulum for oscillation about its vertical axis.

A coil 19, which may comprise several hundred turns of insulated wire of suitable gage, is mounted around the magnet 20, said coil being disposed essentially in a vertical plane passing through the axis of the magnet. One end of the coil 19 may be grounded at 17, and the other end is adapted to be selectively and alternatively connected, through a double-throw switch 15, either to a terminal 13 of a source of power such for example, as a 90 volt battery 11, or to a terminal 16 of a measuring or recording device such as a galvanometer element 12 of a recording oscillograph, said source 11 and recorder 12 having their other terminals grounded as shown at 9 and 14 respectively.

In operation, the present viscosimeter comprising coil 19 and magnet 20 is immersed in a liquid whose viscosity it is desired to determine. The switch 15 is then thrown to contact 13, thus applying to the coil 19 a voltage impulse of a magnitude determined by the setting of a rheostat 10. Although a D. C. source of power 11 is shown for illustration purposes in Fig. 1, it is understood that a suitable source of alternating current may be readily substituted therefor. The frequency of the A. C. used should preferably be in such case approximately equal to the natural frequency of the viscosimeter.

The magnetic field created by the flow of the current through coil 19 reacts with the field of the magnet 20 and causes a torsional displacement of said magnet about its vertical axis from its normal position, such displacement being, for example, of the order of 5 degrees.

When the switch 15 is thereafter thrown to the contact 16, the field of the coil 19 collapses, and the restoring torque of the suspension 22 tends to return magnet 20 to its original position, causing said magnet to oscillate at its natural frequency such as, for example from 30 to 60 cycles per second, gradually coming to rest due to the internal damping in the instrument itself, and to the external damping by the surrounding fluid, which is a measure of the viscosity of said fluid.

Figure 2:
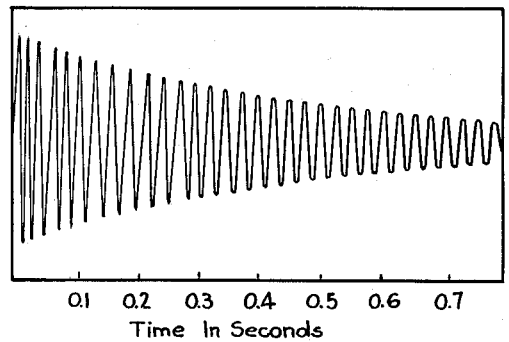
Fig. 2 is a representation of a record obtained with the present instrument.

The oscillation of the magnet relative to the coil induces in the coil a voltage which is proportional to the amplitude of oscillation, the frequency being constant. This induced voltage is applied to the recording galvanometer element, and a permanent photographic record of the oscillation of the magnet throughout a predetermined period is obtained in a manner well known in oscillograph work. Such record is illustrated in Fig. 2. The record is measured for decay of the recorded voltage transient, likewise for any desired time period, and the viscosity is determined by reference to a calibration curve.

The total damping of the oscillating magnet may be said to consist of four components:

1. Internal damping, due to the non-rigidity in the frame and clamps used, hysteresis in the resilient suspension members, etc.
2. Electrical damping, due to energy spent in producing the signal for the galvanometer.
3. Eddy current damping, due to the swinging magnetic field inducing eddy currents in the supporting frame and case of the instrument. To minimize this effect, shields of a metal having a high magnetic permeability may be placed about the coil, and the magnet may be made as weak as permissible.
4. Viscous damping, which is due to, and is a definite function of the viscosity of the fluid.

In general, the electrical and eddy-current types of damping may be said to be negligible with the present device, and the internal damping is about one sixth of the damping value of water at room temperature.

For calibration, the present device is run with the coil and magnet surrounded by fluids of different known viscosities.

Thus, the viscosimeter may be first run with air as the fluid. This is for all practical purposes equivalent to running the instrument in vacuum and supplies the value of the internal damping factor. The instrument may then be run in distilled water and in solutions of glycerine with water of known concentrations, whose viscosities are readily obtained from available handbooks or tables.

Figure 3:
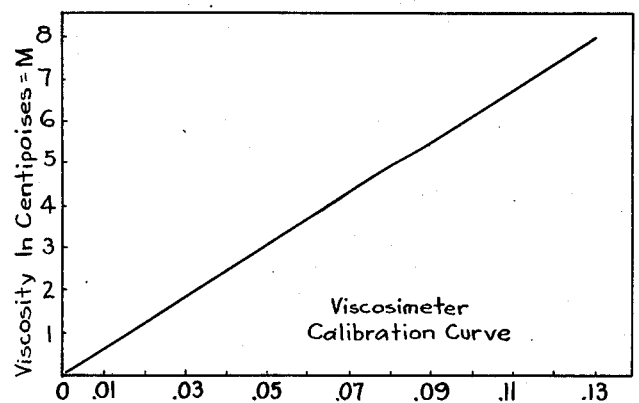
Fig. 3 is a calibration curve used with the present instrument.

From values thus obtained, a calibration curve such as shown in Fig. 3 may be drawn. In this curve, the viscosity M is taken as the ordinate, while the abscissa is represented by a damping factor D, such that $$D = \frac{(N-N_0)^2}{f \cdot p}$$

wherein:

N is the total damping value obtained from the record;

$N_0$ is the internal damping of the instrument, that is, the total damping value obtained with the instrument using air as the fluid;

$f$ is the frequency as read from the record; and $p$ is the density of the fluid.

Figs. 4 and 5 give front and side elevation views of a practical embodiment of the present viscosimeter adapted for operation at the bottom of a well.

In Figs. 4 and 5, numeral 35 indicates a head having upper and lower threaded pins 33 and 37 respectively. Pin 33 is used for attachment to a tubing string or cable socket, not shown, and is provided with a contact 31 for electrical connection to the conductor of the cable.

The lower pin 37 is attachable to a tubular protector housing 39 provided with slots or windows permitting the entry of a fluid, as shown at 50. The housing 39 carries at the bottom a closure or plug member 55, provided with means such as threads 56, whereby a weight or sinker, not shown, may be attached to the housing.

Attached to the head 35 by any desired means, as shown at 34, is an elongated base member 36, made of any suitable non-magnetic metal.

Attached to the base 36, as shown at 41, is an elongated frame member 43, also made of a non-magnetic material having a slot 42 extending substantially the whole length thereof. The frame 43 is painted, or otherwise electrically insulated, and has wound thereon a coil 49 corresponding to the coil 19 of Fig. 1. Coil 49 may have, as an illustration, a length of about 10 inches and comprise about 800 turns of No. 39 B. and S. gage wire, suitably insulated by oxidation or other process.

Affixed by screws 44 to the base 36 within the frame 43, are an upper clamp 45 and a lower clamp 53, between which the cylindrical magnet 20 is suspended on resilient support members such for example, as flat beryllium-copper torsion springs 47 and 51 fixedly attached to the clamps and to the magnet respectively as shown at 46.

It has been found that certain types of fluids, such as well fluids, sometimes carry in suspension or admixture therewith small magnetic particles of a magnetic metal, such for example, as may be produced by the rubbing of metallic equipment during drilling, or may be due to the use of magnetite as a mud weighting agent in drilling the well. These particles are attracted by the oscillating magnet and attach themselves thereto, thus modifying its natural constants and somewhat decreasing the accuracy of the instrument.

To obviate this difficulty, the device of Figs. 4 and 5 may be modified to the form schematically shown in Fig. 6; representing a device similar to that of Figs. 4 and 5, but from which all unessential details have been eliminated.

In the embodiment of Fig. 6, the coil is the rotatable or oscillating element of the instrument. If desired, the coil is mounted inside a fluid tight cylinder 60, made of a non-magnetic material such as stainless steel, aluminum, etc. The coil and cylinder 60 are mounted for oscillation between clamps 61 and 63, being held by means of resilient suspending members 65 and 66, which are preferably tubular to accommodate a wire suitably connecting the coil within cylinder 60 with the electrical circuit of the system. For example, hypodermic needles may be conveniently used as elements 65 or 66. Means such as a screw 67 at clamp 63 are provided to regulate and adjust the tension of the elements 65 or 66. Fixedly mounted on a suitable base element, which may be similar to that of Figs. 4 and 5, on either side of the cylinder 60, are elongated permanent magnets 71 and 72, magnetized longitudinally as already described with regard to Fig. 4, and in such manner that the north and south poles thereof do not face the cylinder 60, but are arranged at right angles thereto as shown in Fig. 7. In this way, metallic particles attracted to the magnets cannot accumulate in the relatively restricted space between the magnets and the cylinder and thus cannot interfere with the oscillation of the cylinder.

It is understood that the device of Fig. 6 is mounted in a housing similar to that of Fig. 4.

In operation, the present device may be lowered into the well at the end of a conductor cable and operated from the surface in a manner which is clear from the preceding description with reference to Fig. 1.

It is understood that the apparatus of the present invention may likewise be operated in a laboratory or other location at the surface by placing the viscosimeter in a fluid-tight container and transferring thereto the fluid from a pressure bomb obtained within a well. In such case, obviously, the oscillation of the coil or of the magnet may be started manually or mechanically instead of electrically.

It is understood that although the magnet in Figs. 1, 4, 5 and the coil housing of Fig. 6 have been described as cylindrical, this being the most suitable and therefore the preferred shape, these elements may be given any other desired form, for example, spherical, said elements having preferably a circular cross-section in a plane normal to their axis of rotation.

It is also understood that although the present invention has been described with regard to devices with one or two magnets, devices having more than two magnets may be used without departing from the principle of the present invention.

We claim as our invention:

1. In a device for measuring the viscosity of a fluid, magnet and coil means adapted to be immersed in said fluid, torsional means supporting one of said means for periodic rotational oscillation with regard to the other, a source of current, a voltage recording element, and switch means in circuit with said coil means for alternatively connecting said coil means to said source and said recording element, whereby said periodic oscillation is selectively initiated by applying an electric impulse to said coil means from said source, and is selectively recorded by applying to said recording element the oscillatory voltage produced in said coil means by intersection during oscillation with the lines of force of said magnet means, the decay of the recorded oscillatory voltage due to the damping of said oscillation by said fluid being a measure of the viscosity of said fluid.

2. A viscosimeter adapted to be immersed in a fluid to measure the viscosity of said fluid, said viscosimeter comprising a support member, two vertically disposed spaced bar magnets fixedly mounted thereon, the north and south poles of each of said magnets being distributed along opposite vertical faces thereof, coil means disposed substantially in a vertical plane, resilient means suspending said coil means for periodic oscillation about a vertical axis in the magnetic field of said magnet means, means for initiating such oscillation, whereby an oscillatory voltage is produced in said coil means by the oscillation thereof in said magnetic field, and means for recording said voltage, the damping of the recorded oscillatory voltage being a measure of the viscosity of the fluid in which said coil means are immersed.

3. A viscosimeter adapted to be immersed in a fluid to measure the viscosity thereof, said viscosimeter comprising an elongated coil longitudinally disposed substantially in a vertical plane, resilient means suspending said coil for periodic oscillation about a substantially vertical axis, a cylindrical housing enclosing said coil for integral oscillation therewith, two vertically disposed spaced bar magnets fixedly positioned on either side of the coil, the north and south poles of each of said magnets being distributed along opposite vertical faces thereof, said polarized faces of said magnets being at right angles to the faces thereof directed towards the coil, means for applying an electric impulse to the coil, thereby initiating an oscillation of the coil in the magnetic field of said magnets, and means for recording throughout a predetermined time period the oscillatory voltage produced by said oscillation, the decay of the recorded oscillatory voltage due to the damping of the coil oscillation being a measure of the viscosity of the fluid in which the coil is immersed.

4. The device of claim 3, having means for adjusting the tension of the resilient means suspending the coil, whereby the natural period of oscillation of said coil can be varied.

5. A viscosimeter adapted to be immersed in a fluid to measure the viscosity thereof, said viscosimeter comprising an elongated coil longitudinally disposed substantially in a vertical plane, resilient means suspending said coil for periodic oscillation about a substantially vertical axis, a cylindrical housing enclosing said coil for integral oscillation therewith, two vertically disposed spaced bar magnets fixedly positioned on either side of the coil, the north and south poles of each of said magnets being distributed along opposite vertical faces thereof, said polarized faces of said magnets being at right angles to the faces thereof directed towards the coil, an electric circuit comprising a source of current, a voltage recording element, and switch means in circuit with said coil means for alternatively connecting said coil means to said source and said recording element whereby said periodic oscillation is selectively initiated by applying an electric impulse to said coil means from said source and is selectively recorded by applying to said recording element the oscillatory voltage produced in said coil means by intersection during oscillation with the lines of force of said magnet means, the decay of the recorded oscillatory voltage due to the damping of said oscillation by said fluid being a measure of the viscosity of said fluid.

6. The device of claim 5, wherein the resilient means suspending the coil comprise tubular means fixedly attached to the cylindrical housing, the internal bore of said tubular means being adapted to receive an electrical conductor connecting said coil to said electric circuit.

7. In a method for measuring the viscosity of a fluid, the steps of immersing in said fluid a magnet and a coil disposed in the field of said magnet, initiating a condition of relative oscillation between said magnet and said coil by passing an electric impulse through said coil, recording the oscillatory voltage induced in said coil by intersection with the lines of force of the field of said magnet, and determining the viscosity of said fluid from the damping effect exerted thereby on the oscillating coil by measuring the decay of the recorded oscillatory voltage throughout a predetermined time period.

8. In a device for measuring the viscosity of a fluid, magnet means and coil means adapted to be immersed in said fluid, torsional means supporting the magnet means for periodic oscillation with regard to the coil means, a source of current, a voltage recording element, and switch means in circuit with said coil means for alternatively connecting said coil means to said source and said recording element, whereby said periodic oscillation is selectively initiated by applying an electric impulse to said coil means from said source, and is selectively recorded by applying to said recording element the oscillatory voltage produced in said coil means by intersection during oscillation with the lines of force of said magnet means, the decay of the recorded oscillatory voltage due to the damping of said oscillation by said fluid being a measure of the viscosity of said fluid.

9. In a device for measuring the viscosity of a fluid, magnet means and coil means adapted to be immersed in said fluid, torsional means supporting the magnet means for oscillation about a vertical axis, the poles of said magnet means being located on diametrically opposite sides of said axis in a direction normal to said axis, said coil means surrounding said magnet means, said coil means being disposed substantially in a vertical plane passing through said axis, a source of current, a voltage recording element, and switch means in circuit with said coil means for alternatively connecting said coil means to said source and said recording element, whereby said periodic oscillation is selectively initiated by applying an electric impulse to said coil means from said source, and is selectively recorded by applying to said recording element the oscillatory voltage produced in said coil means by intersection during oscillation with the lines of force of said magnet means, the decay of the recorded oscillatory voltage due to the damping of said oscillation by said fluid being a measure of the viscosity of said fluid.

EUGEN MERTEN.
MARSHALL M. ROBINSON.

REFERENCES CITED

The following references are of record in the file of this patent:

UNITED STATES PATENTS

| Number | Name | Date |
|---|---|---|
| 1,604,409 | Grindrod | Oct. 26, 1926 |
| 1,960,226 | Schoenberg | May 22, 1934 |
| 2,268,526 | Palmer | Dec. 30, 1941 |